(12) United States Patent
Bron et al.

(10) Patent No.: US 11,875,273 B2
(45) Date of Patent: Jan. 16, 2024

(54) MACHINE LEARNING CLASSIFICATION OF DIGITAL CONTENT FOR MOBILE DEVICES

(71) Applicant: Oath Inc., New York, NY (US)

(72) Inventors: Marc Bron, London (GB); Mounia Lalmas, London (GB); Huw Evans, London (GB); Mahlon Chute, Sunnyvale, CA (US); Miriam Redi, Barcelona (ES); Fabrizio Silvestri, London (GB)

(73) Assignee: Yahoo Ad Tech LLC, New York, NY (US)

( * ) Notice: Subject to any disclaimer, the term of this patent is extended or adjusted under 35 U.S.C. 154(b) by 932 days.

(21) Appl. No.: 15/473,313

(22) Filed: Mar. 29, 2017

(65) Prior Publication Data

US 2018/0285747 A1 Oct. 4, 2018

(51) Int. Cl.
| | |
|---|---|
| *G06N 5/04* | (2023.01) |
| *H04W 4/50* | (2018.01) |
| *G06N 20/00* | (2019.01) |
| *G06N 20/20* | (2019.01) |
| *H04W 4/23* | (2018.01) |

(52) U.S. Cl.
CPC ............... *G06N 5/04* (2013.01); *G06N 20/00* (2019.01); *G06N 20/20* (2019.01); *H04W 4/23* (2018.02); *H04W 4/50* (2018.02)

(58) Field of Classification Search
CPC .......... G06N 5/04; G06N 20/00; G06N 20/20; H04W 4/23; H04W 4/50
See application file for complete search history.

(56) References Cited

U.S. PATENT DOCUMENTS

| 8,626,585 B1* | 1/2014 | Mhatre | G06Q 30/0276 |
| | | | 705/14.42 |
| 9,697,248 B1* | 7/2017 | Ahire | G06Q 40/025 |
| 2008/0249832 A1* | 10/2008 | Richardson | G06Q 30/02 |
| | | | 705/14.54 |
| 2010/0082421 A1* | 4/2010 | Tuladhar | G06Q 20/102 |
| | | | 705/14.41 |
| 2013/0290117 A1* | 10/2013 | Urban | G06Q 30/02 |
| | | | 705/14.73 |
| 2014/0281878 A1* | 9/2014 | Golan | G06F 40/169 |
| | | | 715/232 |
| 2015/0220972 A1* | 8/2015 | Subramanya | G06Q 30/0246 |
| | | | 705/14.45 |
| 2016/0342288 A1* | 11/2016 | Konik | G06Q 30/0643 |

(Continued)

OTHER PUBLICATIONS

Mounia Lalmas, "Promoting Positive Post-Click Experience for In-Stream Yahoo Gemini Users", Aug. 2015 (Year: 2015).*

(Continued)

*Primary Examiner* — Li B. Zhen
*Assistant Examiner* — Henry Nguyen
(74) *Attorney, Agent, or Firm* — Cooper Legal Group LLC

(57) ABSTRACT

Briefly, example methods, apparatuses, and/or articles of manufacture are disclosed that may be implemented, in whole or in part, using one or more computing devices to facilitate and/or support one or more operations and/or techniques for machine learning (ML) classification of digital content for mobile communication devices, such as implemented in connection with one or more computing and/or communication networks and/or protocols.

20 Claims, 4 Drawing Sheets

(56) References Cited

U.S. PATENT DOCUMENTS

2017/0193545 A1* 7/2017 Zhou .................. G06Q 30/0254
2017/0356032 A1* 12/2017 Barril ..................... A61K 31/33

OTHER PUBLICATIONS

Ritendra Datta, "Studying Aesthetics in Photographic Images Using a Computational Approach", 2006 (Year: 2006).*
Lalmas, Mounia, et al. "Promoting positive post-click experience for in-stream yahoo gemini users." Proceedings of the 21th ACM SIGKDD International Conference on Knowledge Discovery and Data Mining. 2015. (Year: 2015).*
Thomas, Kurt, et al. "Design and evaluation of a real-time url spam filtering service." 2011 IEEE symposium on security and privacy. IEEE, 2011. (Year: 2011).*
Datta, Ritendra, et al. "Studying aesthetics in photographic images using a computational approach." European conference on computer vision. Springer, Berlin, Heidelberg, 2006. (Year: 2006).*
Wang, Gang, et al. "Detecting malicious landing pages in malware distribution networks." 2013 43rd Annual IEEE/IFIP International Conference on Dependable Systems and Networks (DSN). IEEE, 2013. (Year: 2013).*
Kae, Andrew, et al. "Categorization of display ads using image and landing page features." Proceedings of the Third Workshop on Large Scale Data Mining: Theory and Applications. 2011. (Year: 2011).*
Agrawal, Rahul, et al. "Multi-label learning with millions of labels: Recommending advertiser bid phrases for web pages." Proceedings of the 22nd international conference on World Wide Web. 2013. (Year: 2013).*
Robert Haralick, et al., "Textural Features for Image Classification", 6 IEEE Transaction on Systems, Man & Cybernetics, 610-621 (Nov. 1973).
Jana Machajdik & Allan Hanbury, "Affective Image Classification Using Features Inspired by Psychology and Art Theory", MM '10 Proceedings of the 18th ACM International Conference on Multimedia, Oct. 25-29, 2010, 85-86.

* cited by examiner

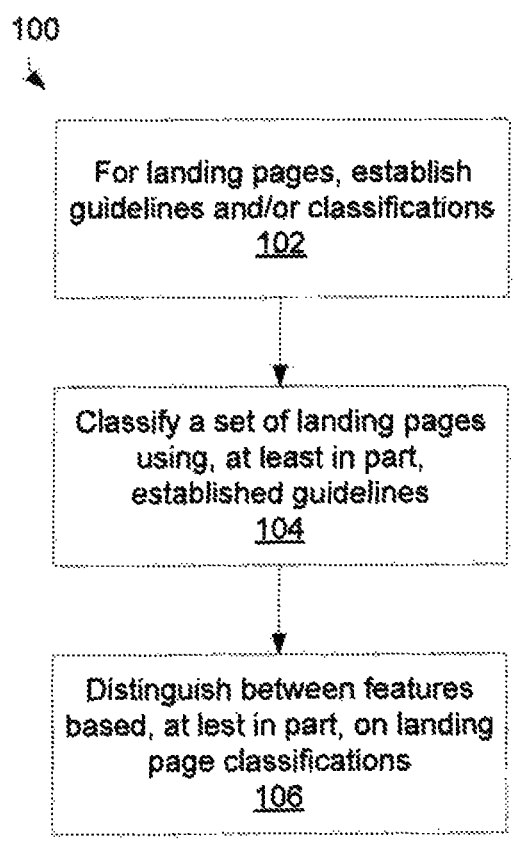
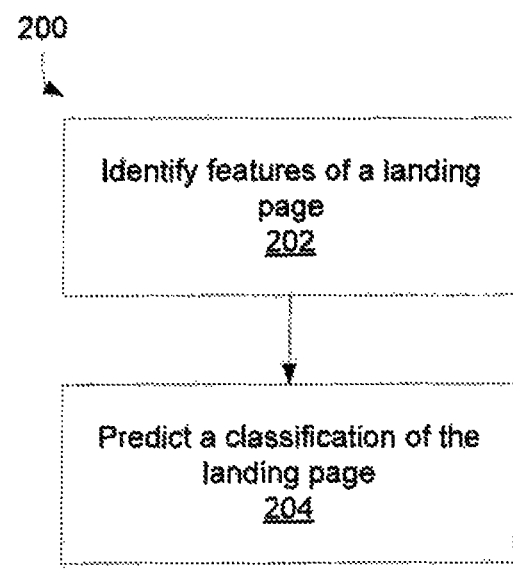
FIG. 2
FIG. 1

MACHINE LEARNING CLASSIFICATION OF DIGITAL CONTENT FOR MOBILE DEVICES

FIELD

This disclosure relates generally to digital content processing and, more particularly, to machine learning (ML) classification of digital content for mobile communication devices.

INFORMATION

The Internet is widespread. The World Wide Web or simply the Web, provided by the Internet, is growing rapidly, at least in part, from the large amount of digital content being added seemingly on a daily basis. A wide variety of digital content in the form of stored signals, such as, for example, web pages, text documents, images, audio files, video files, or the like is continually being identified, located, retrieved, accumulated, stored, or communicated. With a large amount of digital content being available and/or accessible over the Internet, a number of tools and/or services may often be provided to users so as to allow for copious amounts of digital content to be searched in an efficient and/or effective manner. For example, service providers may allow users to search the Web or other like networks using search engine content management systems or search engines. In certain instances, a search engine may enable a user to search the Web by inputting one or more search queries, for example, so as to try to locate and/or retrieve digital content of interest. In addition to locating and/or retrieving digital content, search engines may deliver and/or present or render retrieved content to a user in a suitable manner, such as via an associated computing device having a display capability.

In some instances, particular digital content may, for example, delivered to and/or displayed on a screen or display of a mobile communication device co-located with a user. Mobile communication devices, such as, for example, cellular telephones, personal digital assistants, electronic book readers, portable navigation units, laptop computers, or the like are becoming more common every day. As geographic barriers to personal travel decrease, mobile communication devices play a significant role in allowing society to maintain its mobility. Continued advancements in information technology, communications, mobile applications, etc. help to contribute to a rapidly growing market for mobile communication devices, which have become ubiquitous and may already be viewed as "extensions of the hand" altering the manner in which society communicates, does business, or creates value.

At times, digital content delivered to and/or displayed on a screen or display of a mobile communication device may comprise, for example, one or more advertisements embedded or "impressed" into a rendered web page, such as in the form of a clickable image, text, or the like. In some instances, quality of this or like digital content may, for example, be evaluated and/or assessed, at least in part, via a user's post-click experience, such as dwell time after interaction with digital content, such as via a click. For example, in some instances, dwell time or time spent by a user on a mobile landing page, such as a web page a user of a mobile communication device is redirected to after clicking on a particular digital content before returning back to an originating website may be used, at least in part, to determine whether the mobile landing page meets user's click intent that brought such a user to such a page. Thus, since at times longer dwell time may be associated with digital content provider objectives, such as a "conversion" of a user of a mobile communication device (e.g., purchasing an item, registering to a mailing list, etc.), building an affinity with a particular company, brand, etc., how to improve digital content quality, such as via providing a positive post-click experience to users of mobile communication devices, for example, continues to be an area of development.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings in which:

FIG. 1 is a flow diagram illustrating an implementation of an example process for ML classification of digital content for mobile devices;

FIG. 2 is a flow diagram illustrating another implementation of an example process for ML classification of digital content for mobile devices;

Figure 3:
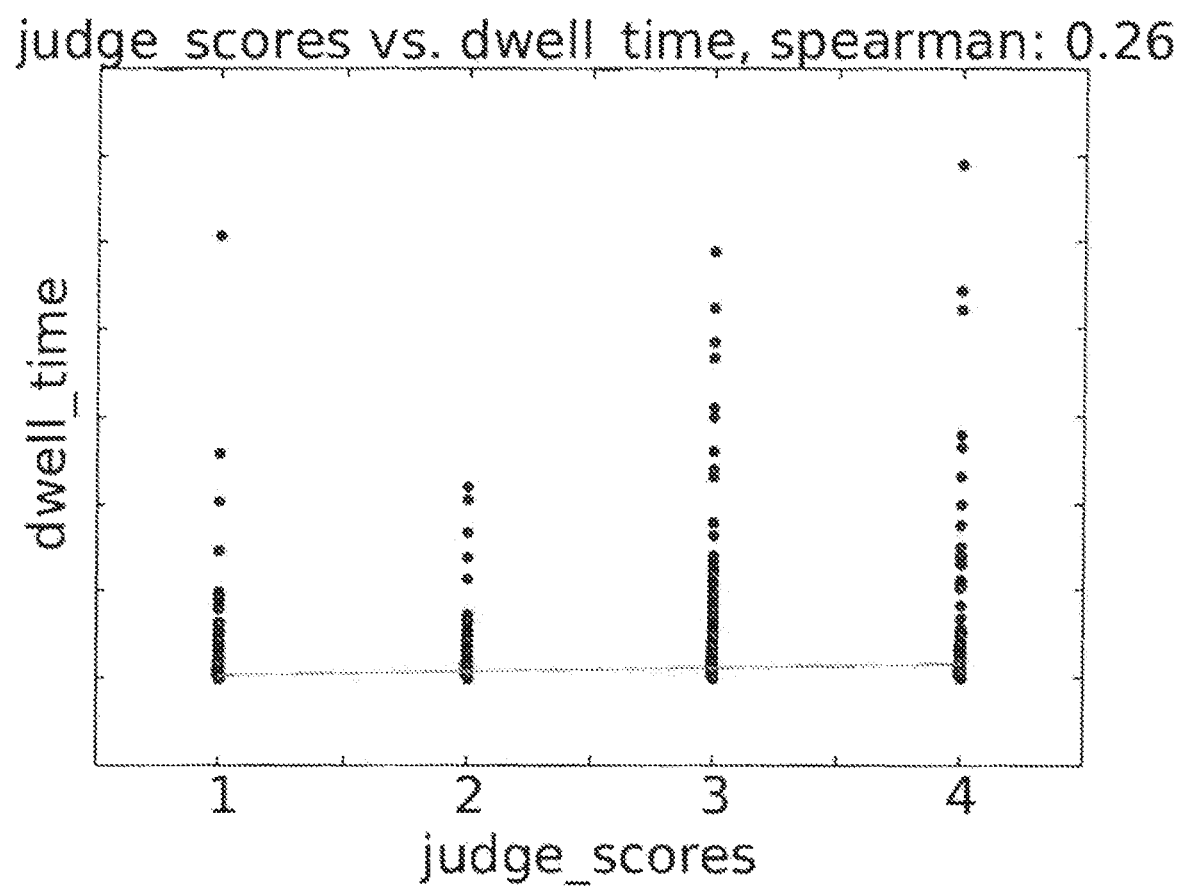
FIG. 3 is an implementation of an example plot of landing page dwell time versus classification values.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

Some example methods, apparatuses, and/or articles of manufacture are disclosed herein that may be used, in whole or in part, to facilitate and/or support one or more operations and/or techniques for machine learning (ML) classification of digital content for mobile communication devices, such as implemented in connection with one or more computing and/or communication networks and/or protocols (e.g., network protocols) discussed herein, for example. As used herein, "mobile communication device" "mobile client device," or like terms may be used interchangeably and refer to any kind of special purpose computing platform and/or apparatus that may from time to time have a position or location that changes. In some instances, a mobile communication device may, for example, be capable of communicating with other devices, mobile or otherwise, through wireless transmission or receipt of information according to one or more communication protocols. As a way of illustration, mobile communication devices, which may herein be called simply mobile devices, may include, for example, cellular telephones, smart telephones, personal digital assistants (PDAs), laptop computers, personal entertainment systems, tablet personal computers (PC), personal audio or video devices, personal navigation devices, or the like. It should be appreciated, however, that these are merely examples of mobile devices that may be used, at least in part, to implement one or more operations and/or techniques for machine learning (ML) classification of digital content, and that claimed subject matter is not limited in this regard.

As alluded to previously, in some instances, digital content may comprise, for example, one or more on-line advertisements or ads embedded or "impressed" into one or more portions of a rendered web page and/or listing of returned search results, such as in connection with personalized or like digital content electronically delivered to mobile devices of co-located users, though claimed subject matter is not so limited. As used herein, "on-line" refers to a type of a communication that may be implemented electronically, such as via one or more suitable communications networks (e.g., wireless, wired, etc.), for example. "Content," as the term used herein, should be interpreted broadly and refers to signals, such signal packets, for example, and/or states, such as physical states on a memory device, for example, but otherwise is employed in a manner irrespective of format, such as any expression, realization, and/or communication, for example. Content may comprise, for example, any information, knowledge, and/or experience, such as, again, in the form of signals and/or states, physical or otherwise. In this context, "electronic," "digital," or "on-line content" refers to content in a form that although not necessarily capable of being perceived by a human, (e.g., via human senses, etc.) may nonetheless be transformed into a form capable of being so perceived, such as visually and/or audibly, for example. Non-limiting examples may include text, audio, images, video, combinations, or the like. Thus, content may be stored and/or transmitted electronically, such as before or after being perceived by human senses. In general, it may be understood that electronic and/or on-line content may be intended to be referenced in a particular discussion, although in the particular context, the term "content" may be employed for ease of discussion. Specific examples of content may include, for example, an e-mail message, text message, audio file, video file, web page, advertisement, or the like, or any combination thereof. Again, claimed subject matter is not intended to be limited to these examples, of course. At times, digital content may include one or more embedded references or hyperlinks to images, audio and/or video files, or other digital content. For example, one common type of reference may comprise a Uniform Resource Locator (URL).

As was also indicated, in some instances, digital content, such as one or more on-line ads, for example, may be delivered and/or displayed on a screen of a mobile device, such as in one or more portions of a rendered web page. A browsing user interested in a particular content (e.g., a car ad, etc.) may, for example, click on a hyperlinked text, image, etc. representative of such content, thus, generating and/or originating a web or like request, which may bring up the content on a screen or display of a mobile device, such as via one or more applicable client-server communications. For example, a mobile device may include a mobile browser or like application that may enable such a mobile device to access and/or display electronic content located on one or more servers associated with a network and/or system (e.g., an advertising server, sponsored search platform, etc.), such as, for example, via a local area network (LAN), a wide area network (WAN), the World Wide Web, the Internet, or the like. As such, in some instances, such as in response to an appropriate web or like request (e.g., clicking on a hyperlink, etc.), a host mobile browser may receive one or more digital signals comprising applicable content from a network or like server, such as for rendering of content on a screen or display of an associated mobile device. Client-server communications and/or mobile browsers are generally known and need not be described here in greater detail.

In certain simulations or experiments, it has been observed that ads having digital content messaging in line with surrounding content that drives users to the page, for example, may increase ad impressions, item conversions, click-through rates (CTRs), or the like. At times, these or like performance indicators, such as implemented in part to improve ad quality, for example, may prioritize short-term revenue, however, potentially at the expense of long-term revenue. Thus, in some instances, so-called "dwell time" or time spent by a user on a landing page, such as a web page a user is directed and/or re-directed to after clicking on a particular on-line ad before closing the ad and/or returning back to an originating website, for example, may be used, at least in part, as a proxy for ad quality. For example, it has also been observed that longer dwell time on an ad landing page may lead a user to "converting" or purchasing an item advertised, registering to a mailing list, building an affinity with a particular company, brand, or the like. As was indicated and as used herein, "landing page" refers to a web page to which a user is directed and/or re-directed in response to the user's interaction with a particular digital content or a portion thereof, such as clicking on an on-line ad having an embedded reference or hyperlink, for example.

A relatively limited screen size and/or resources of mobile devices, however, may create new challenges for digital content delivery, such as mobile advertising, for example, and/or may change a way in which users typically experience and/or consume mobile ads. As such, in some instances, evaluating mobile landing pages may, for example, be useful to at least partially measure actual user engagement (e.g., a click, etc.) and/or potentially predict user post-click behavior (e.g., dwell time, etc.) and, thus, improve quality of particular digital content, such as one or more ads tailored for mobile devices as well as long-term ad revenue, among other things. For example, at times, it may be useful to determine one or more features of particular digital content, such as mobile ads, as one example, that may be predictive of quality of such digital content if displayed on a screen of a mobile device. At times, these or like features of digital content may also be used, at least in part, to determine one or more approaches, such as ML approaches discussed below, for example, for improving digital content quality that may be employed, in whole or in part, by digital content providers, delivery services, computing platforms, or the like to improve mobile ad experience.

For example, as has also been observed, certain features of digital content indicative of particular aspects of mobile users' post-click experience, such as mobile friendliness of ad landing pages and/or their aesthetic appeal, for example, may prove beneficial. Namely, it has been observed that a landing page may be deemed more mobile friendly if it combines overall performance and mobile-specific experience. More specifically, a landing page may, for example, be considered more ad mobile friendly if it provides a good interactive experience (e.g. bigger buttons, few links, etc.), if it makes it easier to understand what a particular ad is about (e.g. a product advertised, etc.), and/or if it allows a user to more easily convert (e.g., purchase a product advertised, etc.), such as if viewed on a screen of an associated mobile device.

With respect to aesthetic appeal of mobile ad landing pages, it has been also observed, for example, that sensory and/or visual appeal of ad-related elements comprising a graphical user interface (GUI), such as a site screen layout, graphics, design principles, etc. may promote more focused attention and/or stimulate curiosity, which, at times, may be important components of mobile user engagement. Briefly, GUI refers to a program interface that utilizes displayed graphical information to allow a user to access and/or manage a special purpose computing platform by a pointer or like device or other peripheral device or mechanism. In the context of the present disclosure, terms such as "click" or "clicking" refer to a selection process made by any pointing device, but use of such terms is not intended to be so limited. For example, in some instances, a selection process may be made via a touch screen. As such, "clicking" may be replaced by "touching," such as without deviating from the scope of claimed subject matter. Accordingly, since positive post-click experience of users of mobile devices may provide an increased return on investment and/or revenue, facilitate and/or support information-seeking behavior of users, lead to an increased usability of a search engine, or the like, it may be desirable to develop one or more methods, systems, and/or apparatuses that may improve quality of digital content to be displayed on mobile devices, such as mobile ad landing pages, for example.

Thus, as will be described in greater detail below, in an implementation, quality of particular digital content, such as mobile ad landing pages, for example, may be defined and/or measured, such as in terms of their friendliness and/or aesthetic appeal, and one or more intrinsic and/or visual features characterizing mobile friendliness and/or aesthetic appeal may, for example, be determined. Based, at least in part, on one or more determined features, an ML classifier capable of sufficiently and/or suitably evaluating or classifying quality of mobile ad landing pages, such as beyond experimental settings and/or samples, for example, may be selected and/or used, at least in part, for mobile page friendliness and/or aesthetics prediction. In addition, a set of guidelines for friendliness and/or aesthetics that may account for particular digital content, such as mobile ad landing pages, for example, may be provided and/or used, at least in part, as ground truth for mobile page friendliness and/or aesthetics evaluation, such as in the context of particular digital content delivery, as will also be seen.

FIG. 1 is a flow diagram illustrating an implementation of an example process 100 that may be performed, in whole or in part, to facilitate and/or support one or more operations and/or techniques for machine learning (ML) classification of particular digital content, such as ad landing pages, for example, for use in or with mobile devices. It should be noted that content acquired and/or produced, such as, for example, input signals, output signals, operations, results, etc. associated with example process 100 may comprise and/or be represented via one or more digital signals. It should also be appreciated that even though one or more operations are illustrated and/or described concurrently and/or with respect to a certain sequence, other sequences and/or concurrent operations may be employed, in whole or in part. In addition, although the description below references particular aspects and/or features illustrated in certain other figures, one or more operations may be performed with other aspects and/or features.

As illustrated, example process 100 may, for example, begin at operation 102 with establishing a set of guidelines, such as for mobile ad landing pages, for example. As was indicated, such guidelines may, for example, account for quality and/or appeal of particular digital content, such as mobile ad landing pages, for example, and may be used, at least in part, as ground truth for mobile page friendliness and/or aesthetics evaluation. Namely, in a particular simulation or experiment, editorial judgments for a sample of ad landing pages representative of various page implementation styles may, for example, be collected and graded, such as via any suitable graded schema. It should be noted that, while grading, it may be useful to account for mobile friendly landing pages providing a positive experience on mobile devices, for example, as well as allowing users to more easily consume a product advertised. Thus, a process capable of addressing one or more aspects more pertinent to delivery of digital content relevant to mobile advertising may be a desirable goal. For example, as will be seen, at times, it may be useful to address or consider size of digital media, size of text, amount of text, button size, number of hyperlinks, etc., just to name a few examples. In some instances, addressing or considering GUI elements related to navigation, such as, for example, menu simplicity, presence of back/home buttons, etc. may also prove beneficial. In addition, a number of steps in conversion (e.g., the fewer the better), ease in filling forms, whether a landing page's explanation of products and/or services is in clear terms, or the like may advantageously capture variations in mobile friendliness and/or aesthetic appeal characterizations, as will also be seen.

Continuing with the above discussion, in at least one implementation, as a graded schema, a four-point scale may, for example, be used, at least in part, or otherwise considered. Claimed subject matter is not so limited, of course. For example, any other suitable grading approach and/or point scale schema may be used, in whole or in part, which may at least partially depend on an implementation, mobile device, mobile ad, type or source of a mobile landing page (e.g., landing pages for professional services may be scored differently than landing pages for a coupon club, etc.), or the like. Thus, consider, for this particular example:

Bad: Mobile ad landing pages providing a mobile experience of lower quality. For example, desktop pages "squeezed" or compressed to fit on a mobile device-sized screen.

Fair: Mobile ad landing pages satisfying two out of three criteria items for otherwise "Good" mobile ad landing pages, discussed below.

Good: Mobile ad landing pages satisfying the following criteria:
1. Good content readability (e.g., uncluttered, bigger text; proportioned media size, etc.)
2. Higher usability on a mobile device (e.g., bigger buttons, fewer links, etc.)
3. More simplified navigation (e.g. simpler menus, clickable back and/or home buttons, more visible call-to-action, etc.)

Perfect: Mobile ad landing pages satisfying criteria for "Good" landing pages, plus with a good overall quality of mobile ads. "Perfect" landing pages may provide ease of conversion (e.g., few-step conversion process, easy-to-fill form, etc.), better product/service experience, such as via explaining product/service advertised in clear terms, facilitating user-business interaction (e.g., by requesting user contacts, etc.), etc.

With regard to operation 104, a set of landing pages may, for example, be classified, such as editorially evaluated using, at least in part, established guidelines. For example, here, judges or editors may utilize established guidelines to evaluate landing pages with respect to their mobile friendliness and/or aesthetic appeal. For consistency, in some instances, two editors may, for example, be used to evaluate a particular landing page. At times, disagreements as to mobile friendliness may, for example, be resolved by a third editor, who may be able to choose an original judgment or assign a new judgment. In some instances, such an approach may, for example, reduce evaluation costs, such as in comparison to utilization of three or more initial judgments, for example. Regarding aesthetic appeal of a landing page, editors may, for example, express a binary judgment (e.g., positive or negative), which may be based, at least in part, on personal taste regarding an overall layout, color balance, composition, or the like.

In one particular simulation or experiment, a team of seventeen editors was used, though claimed subject matter is not so limited. Of these editors, no single editor performed more than 20% of judgments for a sample set of landing pages. Among approximately 4000 landing pages in a set, approximately 1633 landing pages were judged differently as to mobile friendliness by two initial evaluators, meaning that a third editor was used to arbitrate. Thus, experimentation yielded approximately 63% agreement as to mobile friendliness. Of approximately 37% disagreements, approximately 30% were separated by one level of classification (e.g., between perfect and good, good and fair, or fair and bad), approximately 5% were separated by two or more levels of classification, and approximately 2% involved a "Not Judged" rating, as result of a landing page being temporarily unavailable to editors (e.g., a Hypertext Transfer Protocol (HTTP) 404 Not Found error message, etc.). Among judgments collected for approximately 4025 landing pages of interest, a majority were classified as being "Fair" (approximately 35%) or "Good" (approximately 40%). Approximately 9% of landing pages were classified as "Perfect" landing pages, while a substantial number of landing pages (approximately 16%) were classified as "Bad" landing pages. Further, approximately 5% of landing pages were found to be aesthetically pleasing. Of course, these are merely details relating to a particular approach, and claimed subject matter is not so limited. Thus, even though a particular approach may prove beneficial, any other suitable approaches, such as to editorially evaluate or classify mobile ad landing pages may be used herein, in whole or in part, or otherwise considered.

At operation 106, one or more distinctions between features capable of characterizing friendliness and/or aesthetic appeal of mobile ad landing pages may be captured, such as in connection with an ML classifier selected to sufficiently and/or suitably evaluate landing pages' quality, for example, such as consistent with and/or beyond experimental settings and/or samples discussed above. Particular examples of features capable of characterizing mobile friendliness and/or aesthetics of ad landing pages will be discussed in greater detail below. Here, it may be useful to select an ML classifier that may utilize its function or process, in whole or in part, to more effectively and/or efficiently evaluate feature significance in predicting friendliness and/or aesthetic appeal of mobile ad landing pages, for example, such as if compared to generic web pages. By way of example but not limitation, in one particular simulation or experiment, four different ML classifiers having a number of complementary properties were assessed. Thus, consider, for example:

Multiclass Logistic Regression (MLR). An ML classifier may, for example, model or approximate a variable Y by estimating one or more parameters of a Bernoulli distribution using an inverse logit of a linear combination of input feature values, as:

$$P(Y=1 \mid \vec{x}(a)) \sim Ber(p(a)), \text{ with } p(a) = \frac{e^{\vec{b} \cdot \vec{x}(a)}}{1 + e^{\vec{b} \cdot \vec{x}(a)}}$$

In some instances, here, a one-versus-all classification, such as using one or more appropriate multiclass classification techniques may, for example, be used, at least in part, or otherwise considered. Thus, a parameter $(p_k(a))$ of a distribution may, for example, be estimated, such as to approximate a response $(P(Y_k=1 \mid \vec{x}(a)))$, where k denotes one landing page classification label. Random variable $Y_k$ may have a response of 1 if class label k is observed, for example, and 0 otherwise. Further, a class for which $p_k(a)$ is maximum may, for example, be selected as $k = \text{argmax}_{k \in K} p_k(a)$, where K denotes a set of classes.

Gradient Boosted Machines (GBDT). An ML classifier may comprise, for example, an ensemble-type ML classification approach that may be capable of identifying non-linear features from particular digital content, such as mobile ad landing pages, for example, by sequentially fitting an error of a logistic loss function. A parameter $p_k(a)$ may, for example, be estimated by sequentially fitting M decision trees for a particular class k as:

$$p_k(a) = e^{F_k(a)} \bigg/ \sum_{i=1}^{K} e^{F_i(a)}, \text{ where } k = 1, K$$

and $F_k=\sum_{i=1}^{m} wd_i(a)$, where d(a) denotes a decision tree fit to a negative gradient of a loss function at a particular step i and w denotes a weight on a model contribution.

Gradient Boosted Regression Trees (GBRT). An ML classifier may comprise, for example, a variant of GBDT that may estimate a conditional mean (e.g., corresponding to a class label, etc.) of a particular segment of digital content, meaning that, here, it may not be needed or otherwise useful to separately learn a predictive function or process for a particular class. At times, GBRT may also reflect an ordinal nature of classes (e.g., landing page classifications), such as via one or more ranked orders and/or relationships, for example.

Random Forest (RF). An ML classifier may comprise, for example, an ensemble of independent decision trees grown on bootstrapping samples, such as, for example, a random sample per a particular tree of a training set. A tree may, for example, output a possible class, and a final classification may be given by an outcome of a majority of trees in an ensemble (e.g., via majority voting, etc.).

Thus, as discussed below, at times, one or more of these or like ML classifiers may, for example, be used, at least in part, such as in conjunction with one or more mobile ad landing page features to evaluate mobile friendliness and/or aesthetics of a particular set of sample landing pages, such as those discussed above in connection with editorial judgments, though claimed subject matter is not so limited. As such, in some instances, it may be useful to ascertain and/or determine what type of features may, for example, be able to characterize mobile friendliness and/or aesthetic appeal of ad landing pages. For example, in certain simulations or experiments, it has been observed that so-called "intrinsic" and/or "visual" features of mobile ad landing pages may prove beneficial in predicting their mobile friendliness and/or aesthetic appeal. In this context, "intrinsic" feature refers to a measurable and/or quantifiable property derived from particular elements of a landing page, and "visual" feature refers to a measurable and/or quantifiable property derived from an image representation of a landing page.

In an implementation, intrinsic features may, for example, include those derived from a markup, text, and/or objects in rendered HyperText Markup Language (HTML) images comprising mobile ad landing pages. By way of example but not limitation, some examples of intrinsic features extracted and/or computed in connection with one particular simulation or experiment are illustrated in Table 1 below. It should be appreciated that features shown are merely examples to which claimed subject matter is not limited. Thus, consider, for example:

TABLE 1

Example intrinsic features.

| Feature | Dimension | Description |
|---|---|---|
| *Mobile Optimized* | | |
| LandingTextLength | pos integer | No. of non HTML element characters in the page. |
| LandingMainTextLength | pos integer | No. of non HTML element characters in the page with boilerplate text removed. |
| LandingTextMainTextRatio | continuous | Ratio of number of characters with and without boilerplate text. |
| HtmlClickToCallAttribute | binary | Is there a click to call button? |
| HtmlIphoneButtonAttribute | binary | Is there an iPhone button? |
| HtmlMetaViewportExisted | binary | Is viewport available? |
| HtmlNumImages | pos integer | No. of images contained in the landing page. |
| HtmlMediaAttribute | binary | Is there media (e.g., video) on the landing page? |
| CSS_Count | pos integer | No. of CSS style sheets loaded. |
| Frame_Count | pos integer | No. of frames in the page. |
| *Window Size* | | |
| Main_Original_HTML_Size | pos integer | No. of characters in the page including HTML elements. |
| HtmlWindowSize | pos integer | Size of the window. |
| Image_Width | pos integer | Width of the rendered landing page. |
| Image_Height | pos integer | Height of the rendered landing page. |
| *Readability* | | |
| NumWordsHtml | pos integer | No. of words in the page. |
| NumSyllablesHtml | pos integer | No. of syllables in the page. |
| NumComplexHtml | pos integer | No. of complex words (3 or more syllables) in the page. |
| FogReadabilityHtmlScore | continuous | Gunner fog index $\left(0.4 * \left(\frac{\#(words)}{\#(sentences)}\right) + 100 * \frac{\#(complex\_words)}{\#(words)}\right)$ |
| FleschReadabilityHtmlScore | continuous | Flesch score $\left(206.835 - 1.015 * \frac{\#(words)}{\#(sentences)} - 84.6 * \frac{\#(syllables)}{\#(words)}\right)$ |
| KincaidReadabilityHtmlScore | continuous | Flesch-Kinkaid score $\left(0.35 \frac{\#(words)}{\#(sentences)} + 11.8 * \frac{\#(syllables)}{\#(words)} - 15.59\right)$ |
| *Input form* | | |
| HtmlNumClickable | pos integer | No. of clickable objects in the landing page. |
| HtmlNumDropdown | pos integer | No. of dropdown elements. |

TABLE 1-continued

Example intrinsic features.

| Feature | Dimension | Description |
| --- | --- | --- |
| HtmlInputRadioCount | pos integer | No. of radio buttons. |
| HtmlInputTextCount | pos integer | No. of Input Strings. |
| HtmlInputCheckboxCount | pos integer | No. of checkbox. |
| HtmlOnclickCount | pos integer | No. of javascript triggers. |
| Navigation | | |
| LinksExternalCount | pos integer | No. of links pointing to external domains. |
| LinksInternalCount | pos integer | No. of links pointing to the same domains as the landing page. |
| Links_Count | pos integer | Sum of the previous two features. |
| LinksExternalInternalRatio | continuous | Ratio of external vs. internal links. |
| LinksExternalTotalRatio | [0,1] | fraction of external links. |
| LinksInternalTotalRatio | [0,1] | fraction of internal link. |
| LinksTextLengthExternalRatio | continuous | Text per external links ratio. |
| LinksTextLengthInternalRatio | continuous | Text per internal links ratio. |
| LinksTextLengthTotalRatio | continuous | Text per total number of links ratio |
| LinksMainLengthTotalRatio | continuous | Main Text (without boilerplate text) per total number of links ratio. |
| LinksMainLengthExternalRatio | continuous | Main Text (without boilerplate text) per External links ratio. |
| LinksMainLengthInternalRatio | continous | Main Text (without boilerplate text) per Internal links ratio. |

As seen, in some instances, features may, for example, be divided into a number of categories, which may include the following, as a way of non-limiting illustration:

Mobile optimized: features may indicate whether a particular landing page is suitable for a mobile device, such as in comparison to a desktop page, for example. Features may be descriptive of specific elements of a landing page, such as, for example, character numbers, mobile-specific functionality (iPhone® button, click-to-call, etc.), number of images, number of cascading style sheets (CSS), number of frames, or the like.

Window size: features may capture one or more aspects of a size of a rendered HTML image, for example, and may be indicative of whether a size of an ad landing page is suitable for mobile devices.

Readability: features may capture formality of a language used in a text of a landing page. In some instances, it has been observed that certain texts, such as denser and/or more formal texts, for example, may be less pleasant to read on a mobile device (e.g., due to a smaller screen size, etc.).

Input form: features may capture a number and/or type of input elements in a landing page. In some instances, it has been observed that landing pages asking users to provide input through a number of forms may, for example, be considered less mobile friendly than pages with less input.

Navigation: features may capture a proportion of internal links, external links, and/or text contained in a page. Typically, internal links point to a web page or like resource (e.g., web site, etc.) in the same root directory (e.g., within the same web site, domain, etc.), and external links point to a web page or like resource in a different root directory (e.g., outside the same domain, website, etc.). At times, navigation features may also capture ratios and/or relationships between an amount of text on a landing page and landing page hyperlinks.

In an implementation, visual features may, for example, include those derived from ad landing pages via one or more operations and/or techniques of computational aesthetics, such as by quantifying aesthetic characteristics of these pages. By way of example but not limitation, some examples of visual features extracted and/or computed in connection with one particular simulation or experiment are illustrated in Table 2 below. Likewise, it should be appreciated that features shown are merely examples to which claimed subject matter is not limited. Thus, consider, for example:

TABLE 2

Example visual features.

| Feature | Dimension | Description |
| --- | --- | --- |
| Colors | | |
| H, S, V | 3 | Average Hue, Saturation, Brightness computed on the whole image |
| H, S, V (Central Quadrant) | 3 | Average Hue, Saturation, Brightness computed on the central quadrant |
| H, S, V Color Histograms | 20 | Histograms of H, S and V values quantized over 12, 3, and 5 bins |
| H, S, V Contrasts | 3 | Standard deviation of the HSV color histograms distributions |

TABLE 2-continued

Example visual features.

| Feature | Dimension | Description |
| --- | --- | --- |
| Textures | | |
| Contrast | 1 | Ratio between the sum of max. and min. luminance values and the average luminance |
| GLCM Properties | 4 | Entropy, Energy, Contrast, and Homogeneity of the Gray-Level Co-Occurrence Matrix (GLCM) |
| Quality | | |
| Contrast Balance | 1 | Distance between original and contrast-normalized images |
| Exposure Balance | 1 | Absolute value of the luminance histogram skewness |
| JPEG Quality | 1 | No-reference quality estimation algorithm |
| Sharpness | 1 | Sum of the image pixels after applying horizontal/vertical Sobel masks |
| Foreground Sharpness | 1 | Sum of the image pixels after applying horizontal/vertical Sobel masks to foreground |
| Pleasure, Arousal, Dominance | 3 | 3 approx. emotional coordinates based on brightness and saturation |
| Layout | | |
| Presence of Objects | 9 | Amount of saliency in 9 image quadrants |
| Uniqueness | 1 | Difference between the image spectral signal and the average spectrum of natural images |
| Symmetry | 1 | Difference between the histogram of ordered gradients (HoG) feature vectors of the image left-half and right-half |

Similarly, here, features may, for example, be divided into a number of categories, which may include the following, also as a way of non-limiting illustration:

Colors: features may capture a color palette or distribution and may be indicative of aesthetic perception and/or credibility of a landing page. Features may, for example, be computed by converting a landing page image to Hue, Saturation, Brightness (H,S,V) color space and computing an average of a particular channel (H,S,V) for the image and for a central quadrant of the image. (H,S,V) Color Histograms and (H,S,V) Contrast may be computed by quantizing respective Hue, Brightness, and Saturation channels into a number of bins (e.g., 12, 5, and 3 bins, respectively, etc.).

Textures and Contrast: features may capture affective reactions to landing pages via associated textual and contrast patterns. Features may, for example, be computed via a Gray-Level Co-Occurrence Matrix (GLCM) by determining Entropy, Energy, Homogeneity, and/or Contrast properties using Haralick's features. See, as an example, Robert M. Haralick et al., *Textural Features for Image Classification*, 6 IEEE TRANSACTION ON SYSTEMS, MAN & CYBERNETICS, 610-621 (November 1973). A contrast metric for features may, for example, be computed by determining a difference between maximum and minimum luminance values, such as to quantify an extent to which object contours are distinguishable.

Image Quality: features may capture overall image quality and/or degradation due to digital image processing, such as encoding, compression, manipulation, or the like. Here, computed image quality metrics may include, for example, Contrast Balance, Exposure Balance, JPEG Quality, JPEG Blockiness, Pleasure, Arousal, Dominance, and or Sharpness. Contrast Balance may, for example, measure color balance and/or equalization across a color intensity histogram. Exposure Balance may, for example, measure balance in luminance across an image of a landing page. JPEG Quality feature may, for example, measure quality of an image after JPEG compression. JPEG Blockiness may, for example, measure effects of blocking artifacts in a JPEG image. Pleasure, Arousal, and Dominance may, for example, correspond to emotional coordinates based, at least in part, on brightness and saturation. For example, in Jana Machajdik & Allan Hanbury, *Affective Image Classification Using Features Inspired by Psychology and Art Theory*, MM '10 PROCEEDINGS OF THE 18TH ACM INTERNATIONAL CONFERENCE ON MULTIMEDIA, Oct. 25-29, 2010, 85-86, it is noted that saturation and brightness statistics may be quantized due to their "influence on pleasure, arousal and dominance, the three axes of the emotion space according to the dimensional approach to emotions." Overall image Sharpness may also be computed, such as for a particular image and/or its foreground, for example.

Image Layout: features may capture user interface design and/or usability, such as via corresponding object distribution and/or composition symmetry within a landing page space. Here, computed image layout metrics may include, for example, Presence of Objects to quantify a number of objects in suitable image areas (e.g., in nine quadrants or 3×3 sections, etc.), Symmetry in one or more images of a landing page, and/or Uniqueness reflecting unconventionality of an image composition.

In some instances, performance of these or like features may, for example, be compared against a suitable baseline, such as for evaluating mobile ad landing pages with respect to their mobile ad friendliness and/or aesthetic appeal. For example, in certain implementations, a W3C mobileOK library tool (e.g., accessible at https://validator.w3.org/mobile) utilizing batch processing to return mobile friendliness scores may be used, in whole or in part, for feature evaluation. In one particular simulation or experiment, mobileOK library features included those illustrated in Table 3 below. Thus, consider, for example:

TABLE 3

Example mobileOK library features.

| Name | Description |
| --- | --- |
| error classes | Pop-ups, non-text-alternatives, page-title, tables-nested, no-frames, provide-defaults, images-specify-size, measures, external-resources, style-sheets-support, |

TABLE 3-continued

Example mobileOK library features.

| Name | Description |
|---|---|
| | character-encoding-use, page-size-limit, content-format-support, tables-layout, style-sheetsuse, objects-or-script, valid-markup, minimize, image-maps, images-resizing. |
| critical | one hot encoding of critical violations of error classes. |
| severe | one hot encoding of severe violations of error classes. |
| medium | one hot encoding of medium violations of error classes. |
| low | one hot encoding of low violations of error classes. |
| warning | one hot encoding of low violations of error classes. |
| numImageReq | number of loaded images. |
| numStyle | number of loaded style sheets. |
| numDoc | number of time the page was loaded. |
| stylesheets | combined size of the style sheets. |
| images | combined size of the images. |
| document | total size of the document. |
| score | mobileOK score. |

Thus, according to an implementation, intrinsic and/or visual features discussed above may, for example, be used, in whole or in part, in conjunction with a particular ML classifier, such as to predict mobile friendliness and/or aesthetic appeal of ad landing pages. In one particular simulation or experiment, a sample set of landing pages was separately tested using above-referenced ML classifiers, such as to select a classifier capable of sufficiently and/or suitably evaluating landing pages' quality beyond experimental settings and/or samples, for example, and subsequently compared with performance of mobileOK library features. Here, faults detected by a mobileOK library (e.g., the library is designed for general web pages) may, for example, be encoded and used, at least in part, together with a mobileOK score to predict mobile ad landing page friendliness and/or aesthetics.

ML Classifier Evaluation.

Table 4 illustrates performance of ML classifiers on a mobile friendliness ML classification task in terms of weighted area under a curve ($AUC_W$), such as defined for this example as an average of AUC scores for a particular class weighted by support (e.g., a number of true instances), according to a particular simulation or experiment. In some instances, AUC may, for example, address one or more class-invariance concerns, such as by accounting for a training set and/or class imbalance, which may be due, at least in part, to different proportions of training samples in a class. At times, parameters of a particular ML classifier may, for example, be optimized, such as via a grid search over classifier parameter space. As seen, in some instances, Random Forest (RF), such as with 200 full depth trees pruned to leaf nodes with three or more instances, for example, may be useful. As also seen, in this example, RF outperformed the rest of classifiers (except GBDT on two of the feature families), meaning that, in some instances, selecting RF as an ML classifier for mobile ad landing page friendliness and/or aesthetics prediction tasks, such as discussed herein, for example, may prove beneficial. Of course, claimed subject matter is not limited to particular scores, experiments, etc.

TABLE 4

Performance of example ML classifiers.

| feature family | LMR | GBRT | GBDT | RF |
|---|---|---|---|---|
| readability | .531 | .560 | .597 | .589 |
| navigation | .599 | .556 | .631 | .642 |
| inputform | .582 | .575 | .681 | .674 |
| layout | .627 | .585 | .687 | .706 |
| texture | .641 | .570 | .704 | .707 |
| w3c | .687 | .618 | .722 | .726 |
| color | .663 | .576 | .712 | .727 |
| quality | .644 | .618 | .716 | .727 |
| windowsize | .687 | .653 | .724 | .731 |
| mobileoptimized | .697 | .653 | .745 | .752 |
| all | .761 | .680 | .777 | .788 |

Mobile Friendliness Evaluation.

Table 5 illustrates performance of different feature categories on a mobile friendliness prediction task, also according to a particular simulation or experiment. Here, different categories of features may, for example, be used, in whole or in part, to train a suitable ML classifier, such as RF selected in connection with the above discussion of ML classifiers, just to illustrate one possible implementation. Thus, here, weighted AUC as well as AUC scores per class may, for example, be produced via RF. Again, claimed subject matter is not so limited. Likewise, here, ML classifier performance may, for example, be measured in terms of $AUC_W$, such as per a particular (e.g., individual, etc.) class versus other suitable classes. AUCb, AUCf, AUCg, and AUCe denote AUC for a particular classifier, such as bad, fair, good, excellent, respectively, versus the others. Δ denotes a statistically significant improvement over a second highest score in a column at α=0.05 level. Bold text indicates a second highest score in a column, such as for purposes of convenience.

Thus, consider, for example:

TABLE 5

Example AUC scores.

| feature family | $AUC_w$ | $AUC_b$ | $AUC_f$ | $AUC_g$ | $AUC_e$ |
|---|---|---|---|---|---|
| (r) readability | .589 | .518 | .662 | .553 | .586 |
| (n) navigation | .642 | .695 | .677 | .566 | .626 |
| (i) inputform | .674 | .682 | .697 | .618 | .661 |
| (t) texture | .706 | .747 | .734 | .662 | .632 |
| (l) layout | .707 | .825 | .722 | .668 | .620 |
| (3) w3c | .726 | .755 | .752 | .694 | $.725^\Delta$ |
| (c) color | .727 | .795 | .766 | .676 | .623 |
| (q) quality | .727 | .855 | .719 | .696 | .627 |
| (w) windowsize | .731 | .850 | .741 | .707 | .629 |
| (m) mobileopt | .752 | .797 | .769 | .739 | .687 |
| all | $.788^\Delta$ | $.890^\Delta$ | $.800^\Delta$ | $.762^\Delta$ | .693 |

As seen, for this particular example, an ML classifier that uses all or most features outperformed ML classifiers that use subsets of features representing different feature categories in terms of AUCw. As also seen, in differentiating between mobile ad landing pages that are bad-or-not (AUCb), it appears that, at times, window size features may achieve competitive performance, but may be less useful than, for example, a combination of features. It also appears that image quality features may perform suitably well. With respect to fair-or-not (AUCf) as well as good-or-not (AUCg) class, it may, for example, be observed that so-called "mobileopt" features may achieve performance close to that of using a combination of features. In this context, "mobileopt" features refer to those specific to mobile optimization, such as indicative of an on-screen presence of one or more click to call or like buttons, for example, which appear to be sufficient or suitable indicators of whether a page is "Fair" or "Good," such as defined above. In addition, at times, for AUCe, a combination of features may prove useful, which may be on par (or just below) W3C mobileOK features. Again, claimed subject matter is not limited to particular scores, experiments, etc.

Aesthetic Appeal Evaluation.

Table 6 illustrates performance of different feature categories on a mobile aesthetics prediction task, such as according to a particular simulation or experiment. Here, similarly AUC scores may, for example, be produced via RF. Δ denotes a statistically significant improvement over a highest scoring HTML-related feature (in bold) at α=0.05 level. As seen in this particular example, HTML-related features may be less useful for predicting aesthetic appeal of an ad landing page, such as in comparison to image-related features (e.g., color-related features, etc.), for example. As also seen, performance of a combination of image and HTML-related features may, for example, be on par with performance of individual image features. Again, claimed subject matter is not limited to particular results, experiments, etc.

TABLE 6

Example AUC scores.

| HTML-related features | | Image-related features | |
|---|---|---|---|
| feature category | AUC | feature category | AUC |
| inputform | .541 | layout | .633$^\Delta$ |
| navigation | .551 | all | .661$^\Delta$ |
| mobileopt | .566 | quality | .680$^\Delta$ |
| readability | .570 | texture | .688$^\Delta$ |
| | | color | .695$^\Delta$ |

In an embodiment, it may be desirable to evaluate a combination of different feature sets, such as in predicting mobile friendliness and/or landing page aesthetics in a more effective and/or more efficient manner. For example, at times, better or otherwise suitably performing feature sets for a particular ML classifier may be combined and used, at least in part, to compute one or more predictive metrics. Thus, consider, for example:

1. Feature Importance. Here, out-of-bag permutations may, for example, be used, in whole or in part, such as to determine which features an ML classifier (e.g., RF, etc.) considers to be more discriminative at distinguishing between different classes of mobile friendliness.
2. Feature Correlation. Here, Spearman's rank correlation coefficient (p) between a particular feature and ad labels may, for example, be computed, such as to determine a direction of association between more important features and dependent variables. At times, Spearman's correlation may also be used, at least in part, between a particular feature and aesthetics judgments (e.g., editorial evaluations, etc.).

With regard to feature correlation, a particular simulation or experiment indicated that correlation between mobile friendliness and aesthetics judgments may be statistically significant (e.g., $\rho=0.27$, etc.). Furthermore, it also appeared that there may be a positive correlation between mobile friendliness and dwell time (e.g., 0.26, etc.). FIG. 3 illustrates an example correlation between mobile friendliness and dwell time, such as via a least squares regression line running across four judge score classification values, according to an implementation. Correlation shown in FIG. 3 suggests that users tend to stay longer on mobile friendly as well as aesthetically pleasing landing pages. As also seen, it appears that mobile friendliness and aesthetics may contribute somewhat different dimensions to characterization of post-click user experience, such as with respect to dwell time, for example.

Figure 4A:
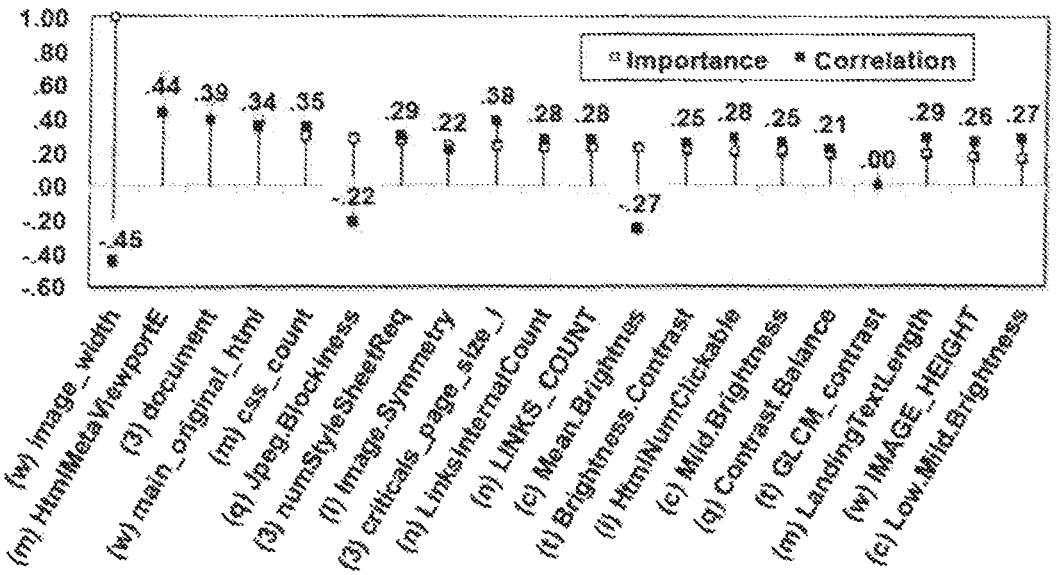
FIGS. 4A and 4B are implementations of example plots illustrating feature importance and correlation as to mobile friendliness and aesthetics, respectively.

Example evaluation results for top important features, such as determined in accordance with a particular simulation or experiment are illustrated in FIGS. 4A (for mobile friendliness) and 4B (for aesthetics). As seen, a more discriminative feature for mobile friendliness prediction may be an image width, (e.g., a width of rendered HTML image, etc.). Also, features like window size, main original HTML size, and image height, appear to be useful. Consequently, it appears that predicting mobile friendliness using these or like features may, for example, be computationally inexpensive. In addition, mobile optimized features, such as HtmlMetaViewportExisted, CSS_Count and LandingTextLength, for example, as well as W3C family features, such as document size, numStyle, and critical page size limit (e.g., amount of style sheets used in a landing page and a size of the landing page, respectively) may indicate that a size of a page and/or an amount of style sheets requested by a mobile browser may affect performance of mobile landing pages.

With respect to image-related features for mobile friendliness prediction, it appears that a JPEG Blockiness feature (e.g., amount of compression noise in an image) may, for example, be sufficiently discriminative. At times, there may be little or no compression in an image of a rendered HTML, for example, and an JPEG Blockiness feature may become a measure of overall smoothness of a landing page. A JPEG Blockiness feature appears to be negatively correlated with mobile friendliness, thus suggesting that images of pages that look cleaner and/or less pixelized may tend to be more mobile friendly.

It also appears that, in some instances, shape and/or color balance may, for example, contribute to usable interfaces. For example, as seen in FIG. 4A, Symmetry and/or Contrast Balance may be positively correlated with mobile friendliness, indicating that lower quality mobile pages may have rather bright color combinations. As also illustrated, for higher quality mobile friendly pages, an average Mean Brightness feature may, for example, be on a lower range (Low/Mild). A positive correlation with a Brightness Contrast feature may also be observed, indicating that diversity in brightness values may, for example, be observed in higher quality mobile friendly pages (e.g., a presence of a smaller number of bright colors with an otherwise moderate use of brightness, etc.).

Figure 4B:
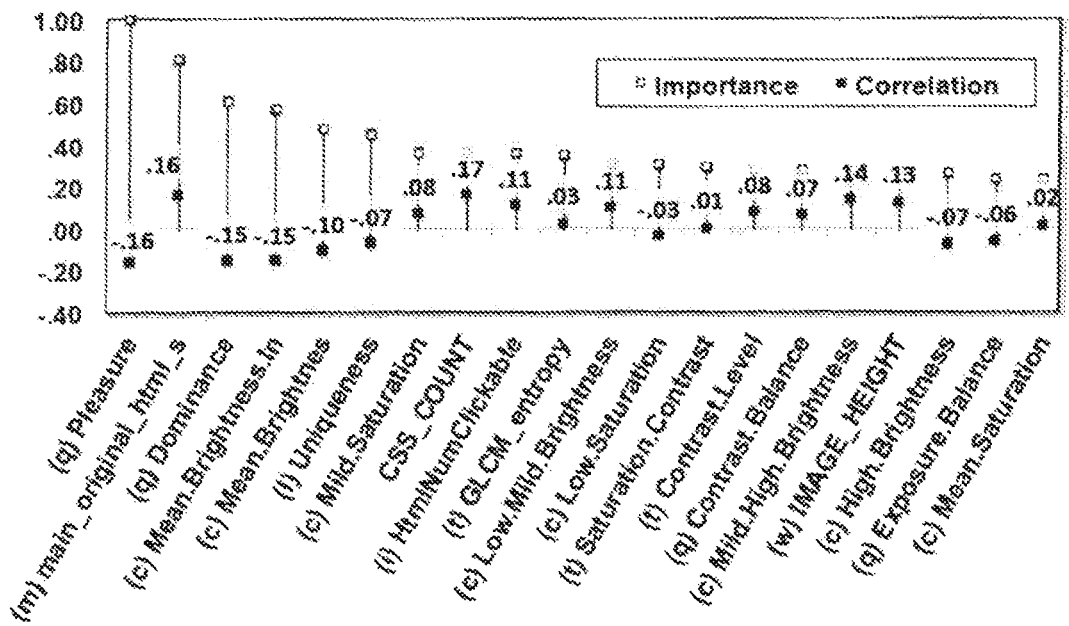

Further, as seen in FIG. 4B, one of more important features to distinguish landing pages for aesthetic appeal appears to be a Pleasure feature. A negative correlation between a Pleasure feature and landing page aesthetic appeal may, for example, be due, at least in part, to the fact that an associated descriptor was originally designed for natural photographs and, as such, may be directly proportional to an amount of brightness in a picture. Other important brightness-related features may comprise, for example, a Brightness of a central quadrant of a page, such as a screen area where a call-to-action or like button may be placed. Again, a negative correlation coefficient of this feature (and/or other brightness-related features, such as Dominance, etc.) may be indicative of the fact that users may prefer less "flashy" colors for this part of a page.

Overall, a particular simulation or experiment appears to suggest that users may prefer a wider range of brightness shades (e.g., higher Brightness Contrast, etc.), rather than a "less exciting" Exposure Balance. At times, a lower saturation may also be a negative indicator of page aesthetics. It may also be observed that texture features (in our case, from the GLCM) may, for example, be important for evaluating page aesthetics. In terms of composition, uniqueness of an object arrangement may be inversely correlated with page beauty, for example, while a presence of one or more objects in certain focus areas may be a positive indicator of page aesthetic appeal. In some instances, this may, for example, suggest that aesthetically pleasant mobile friendly landing pages may follow a particular pattern, and/or that deviating from this pattern may be less useful for predicting mobile friendly and/or aesthetically pleasing landing pages.

FIG. 2 is a flow diagram illustrating an implementation of an example process 200 that may be performed, in whole or in part, to facilitate and/or support one or more operations and/or techniques for ML classification of digital content for mobile communication devices. Likewise, at times, example process 200 may be implemented, at least in part, in connection with one or more ML approaches, such as utilizing an RF function discussed above. Similarly, it should be noted that content acquired and/or produced, such as, for example, input signals, output signals, operations, results, etc. associated with example process 200 may comprise and/or be represented via one or more digital signals. It should also be appreciated that even though one or more operations are illustrated and/or described concurrently and/or with respect to a certain sequence, other sequences and/or concurrent operations may be employed, in whole or in part. In addition, although the description below references particular aspects and/or features illustrated in certain other figures, one or more operations may be performed with other aspects and/or features.

Example process 200 may begin with identifying one or more features of particular digital content, such as a mobile ad landing page, for example. As was indicated, in some instances, landing page features may comprise, for example, one or more of features listed in and/or identified via one or more approaches discussed above in connection with Tables 1, 2, and/or 3. To illustrate, sample landing page features may comprise, for example, HTML-related features, such as features indicative of mobile optimization, window size, readability, input forms, navigation, etc. Sample landing page features may also comprise, for example, image-related features, such as color-type features, texture and contrast-type features, image quality-type features, image layout-type features, etc. In some instances, features may comprise, for example, features from the mobileOK library, such as also discussed above. At times, one or more applicable features for objects comprising a landing page may, for example, be represented via a feature space, such as via a feature vector x for a corresponding feature of interest. Feature vectors are generally known and need not be described herein in greater detail.

At operation 204, a prediction with respect to an ML classification of a landing page may, for example, be made. In some instances, a predicted classification may, for example, be based, at least in part, on one or more features of a landing page, such as those identified in connection with operation 202. For example, at times, a predicted ML classification may comprise a mobile friendliness classification, such as bad, fair, good, or excellent, such as discussed above. In some instances, a predicted ML classification may comprise, for example, a binary aesthetic classification (e.g., positive or negative). Also, at times, a predicted ML classification may comprise, for example, a binary aesthetic classification and a mobile friendliness classification, just to illustrate another possible implementation. In some instances, an ML prediction of landing page classification may involve, for example, traversing a number of trees from root nodes to leave nodes based, at least in part, on a rule associated with a particular node that may specify a range for a particular feature value, which may determine whether a left or right child of a node may be evaluated next. For example, starting at a root node of a tree, based, at least in part, on evaluation of a rule associated with the root node for a particular feature vector, a right child of a root may be considered next. This process or approach may continue, for example, until a leave node is reached specifying a class to be associated with a particular instance. In some instances, different trees may, for example, yield different classes and a final class associated with an instance may be based, at least in part, on a most or more frequent class associated to it by some or all trees.

```
/* x is a landing page feature vector with j features */
/* T={T₁, . . . , T_K} is a set of decision trees trained according to a
machine learning-type approximation approach (e.g., RF). For each
decision tree T_k, there exists a set of paths P_K with each path comprising
i nodes p_{k,i} P_K with each path leaf node having a classification c={b,f,g,e}.
Each node p_{k,i} has a rule associated with it that determines whether a
feature value of x falls within a certain range.*/
/* The following illustrative routine returns a landing page classification
value lpc for x comprising one of c={b,f,g,e}. */
ClassificationPrediction(x,T) {
  | classes = [b] //initialize matched classes with default class b
  | for k=1, . . . ,K do {
  |     | p_c = root(T_k) // initiate the current node as the root of the tree
  |     | while not is_leave_node(p_c) do {
  |     |     |
  |     |     | if is_true(p_c, x) do { // evaluate the rule associate
  |     |         with the node
  |     |     |     | p_c = right_child(p_c) //assign right child as
  |     |             current node
  |     |     | }else {
  |     |     |     | p_c = left_child(p_c)
  |     |     | }
  |     |     | if is_leaf_node(p_c) {
  |     |     |     | classes[k] = p_c[leaf node value]
  |     |     | }
  |     | }
  | } | }
  | return mode(classes) // return most frequent class, pick random if
    multiple
}
```

For this example, a pseudo code proposes a routine in which an ML classification may, for example, be determined for a landing page, such as based, at least in part, on one or more landing page features, as discussed herein. In some instances, a similar approach may, for example, be used, in whole or in part, to yield a binary landing page aesthetic classification. By way of non-limiting example, a set of decision trees resulting from machine learning-type RF approximation training based, at least in part, on aesthetic features, may, for example, be used, in whole or in part, in conjunction with a landing page, and may yield a binary value indicative of whether the landing page is predicted to have a positive or negative aesthetic classification.

Of course, the foregoing example is provided merely by way of illustration and is not to be understood to limit the application to a particular approach, such as an RF approximation approach, or classification prediction routine, by way of non-limiting example. Indeed, it is believed that the foregoing discussion provides a foundation for a number of possible approximation approaches and/or landing page classification approaches.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second", "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements or identical results, unless otherwise expressly indicated.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices, one or more server devices and/or one or more peer-to-peer devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device, a client device and/or a peer-to-peer device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present disclosure, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, Md., 21050-2747), but may include other aspects, such as the Hadoop distributed file system (HDFS) (available from the Apache Software Foundation, 1901 Munsey Drive, Forrest Hill, Md., 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present disclosure, use of the term "Hadoop" is intended to include versions, presently known and/or to be later developed.

In the context of the present disclosure, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in a non-transitory memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present disclosure, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present disclosure, the term "transparent," if used with respect to particular communicating devices of a network, refers to the devices communicating via the network in which the devices are able to communicate via one or more intermediate devices, such as of one or more intermediate nodes, but without the communicating devices necessarily specifying the one or more intermediate nodes and/or the one or more intermediate devices of the one or more intermediate nodes. Thus, a network may include the one or more intermediate nodes and/or the one or more intermediate devices of the one or more intermediate nodes in communications and the network may engage in communications via the one or more intermediate nodes and/or the one or more intermediate devices of the one or more intermediate nodes, but the network may operate as if such intermediate nodes and/or intermediate devices are not necessarily involved in communications between the particular communicating devices. For example, a router may provide a link and/or connection between otherwise separate and/or independent LANs.

In the context of the present disclosure, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present disclosure that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present disclosure, may comprise a service that organizes stored digital content, such as, for example, text, images, video, etc., through the use of hypermedia, for example. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present disclosure, the term "Web site" and/or similar terms refer to Web pages that are associated electronically to form a particular collection thereof. Also, in the context of the present disclosure, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present disclosure, the terms "entry," "electronic entry," "document," "electronic document," "content," "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present disclosure, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present disclosure, a component is physical, but is not necessarily tangible. As an example, components with reference to an electronic document and/or electronic file, in one or more embodiments, may comprise text, for example, in the form of physical signals and/or physical states (e.g., capable of being physically displayed and/or maintained as a memory state in a tangible memory). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed and/or maintained as a memory state in a tangible memory). In an embodiment, digital content may comprise, for example, text, images, audio, video, haptic content and/or other types of electronic documents and/or electronic files, including portions thereof, for example.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this disclosure, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present disclosure, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present disclosure, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular disclosure, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present disclosure, the term "between" and/or similar terms are understood to include "among" if appropriate for the particular usage and vice-versa. Likewise, in the context of the present disclosure, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, or 4G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), IEEE 802.11 (including, but not limited to, IEEE 802.11b/g/n), and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 5:
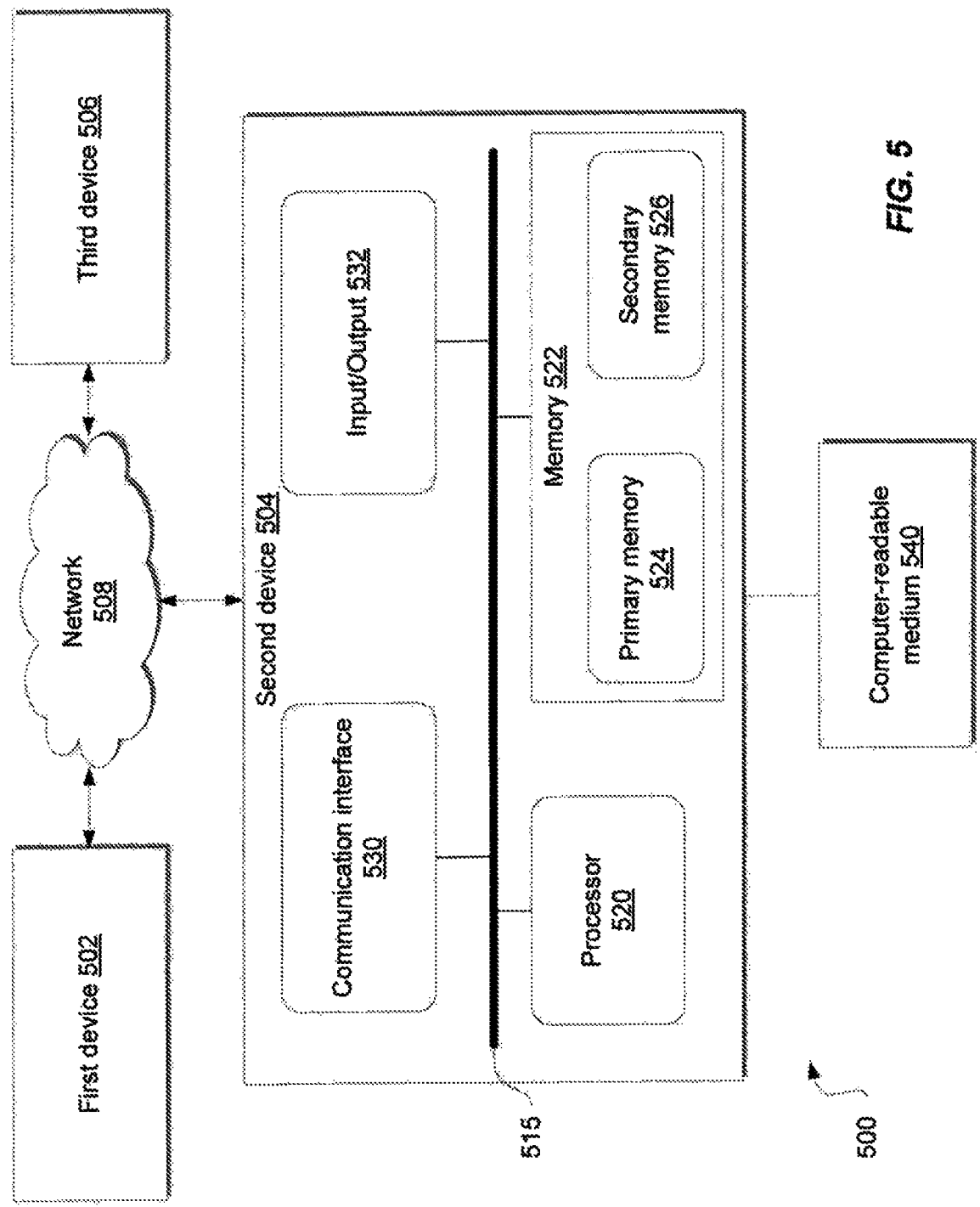
FIG. 5 is an illustration of an embodiment of a system in a networking and/or computing environment.

In one example embodiment, as shown in FIG. 5, a system embodiment may comprise a local network (e.g., device 504 and medium 540) and/or another type of network, such as a computing and/or communications network. For purposes of illustration, therefore, FIG. 5 shows an embodiment 500 of a system that may be employed to implement either type or both types of networks. Network 508 may comprise one or more network connections, links, processes, services, applications, and/or resources to facilitate and/or support communications, such as an exchange of communication signals, for example, between a computing device, such as 502, and another computing device, such as 506, which may, for example, comprise one or more client computing devices and/or one or more server computing device. By way of example, but not limitation, network 508 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 5 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present disclosure at least, this is understood to refer to sufficient structure within the meaning of 35 § USC 112(f) so that it is specifically intended that 35 § USC 112(f) not be implicated by use of the term "computing device" and/or similar terms; however, if it is determined, for some reason not immediately apparent, that the foregoing understanding cannot stand and that 35 § USC 112(f) therefore, necessarily is implicated by the use of the term "computing device" and/or similar terms, then, it is intended, pursuant to that statutory section, that corresponding structure, material and/or acts for performing one or more functions be understood and be interpreted to be described at least in conjunction with FIGS. 1 and 2 and relevant paragraphs discussing the method embodiments of FIGS. 1 and 2.

Referring now to FIG. 5, in an embodiment, first and third devices 502 and 506 may be capable of rendering a graphical user interface (GUI) for a network device and/or a computing device, for example, so that a user-operator may engage in system use. Device 504 may potentially serve a similar function in this illustration. Likewise, in FIG. 5, computing device 502 ('first device' in figure) may interface with computing device 504 ('second device' in figure), which may, for example, also comprise features of a client computing device and/or a server computing device, in an embodiment. Processor (e.g., processing device) 520 and memory 522, which may comprise primary memory 524 and secondary memory 526, may communicate by way of a communication bus 515, for example. The term "computing device," in the context of the present disclosure, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present disclosure, may comprise hardware, software, firmware, or any combination thereof (other than software per se). Computing device 504, as depicted in FIG. 5, is merely one example, and claimed subject matter is not limited in scope to this particular example.

For one or more embodiments, a computing device may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, OSX, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 5, computing device 502 may provide one or more sources of executable computer instructions in the form physical states and/or signals (e.g., stored in memory states), for example. Computing device 502 may communicate with computing device 504 by way of a network connection, such as via network 508, for example. As previously mentioned, a connection, while physical, may not necessarily be tangible. Although computing device 504 of FIG. 5 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 522 may comprise any non-transitory storage mechanism. Memory 522 may comprise, for example, primary memory 524 and secondary memory 526, additional memory circuits, mechanisms, or combinations thereof may be used. Memory 522 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 522 may be utilized to store a program of executable computer instructions. For example, processor 520 may fetch executable instructions from memory and proceed to execute the fetched instructions. Memory 522 may also comprise a memory controller for accessing device readable-medium 540 that may carry and/or make accessible digital content, which may include code, and/or instructions, for example, executable by processor 520 and/or some other device, such as a controller, as one example, capable of executing computer instructions, for example. Under direction of processor 520, a non-transitory memory, such as memory cells storing physical states (e.g., memory states), comprising, for example, a program of executable computer instructions, may be executed by processor 520 and able to generate signals to be communicated via a network, for example, as previously described. Generated signals may also be stored in memory, also previously suggested.

Memory 522 may store electronic files and/or electronic documents, such as relating to one or more users, and may also comprise a device-readable medium that may carry and/or make accessible content, including code and/or instructions, for example, executable by processor 520 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining," "establishing," "obtaining," "identifying," "selecting," "generating," and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 5, processor 520 may comprise one or more circuits, such as digital circuits, to perform at least a portion of a computing procedure and/or process. By way of example, but not limitation, processor 520 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 520 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 5 also illustrates device 504 as including a component 532 operable with input/output devices, for example, so that signals and/or states may be appropriately communicated between devices, such as device 504 and an input device and/or device 504 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
   identifying features of a landing page;
   determining, based upon the features of the landing page, a combination of feature sets, comprising a combination of image-related features and markup language-related features, determined to be more discriminative at distinguishing between classes of mobile friendliness of the landing page than one or more other feature sets, wherein the image-related features comprise at least one of color-type features, texture-type features or contrast-type features;
   selecting a machine learning (ML) classifier from among a plurality of ML classifiers based upon (i) testing a sample set of landing pages using the plurality of ML classifiers, (ii) determining that the ML classifier has a highest performance score amongst the plurality of ML classifiers, and (iii) comparing performance of the ML classifier with performance of a library tool configured with one or more defined library features;
   predicting, based upon a processing of the combination of feature sets and the features of the landing page using the ML classifier, an ML classification of the landing page as to post-click user experience of a mobile device user,
   wherein predicting the ML classification comprises:
      traversing two or more trees associated with the landing page, from one or more root nodes to one or more leave nodes, based upon one or more rules specifying one or more ranges for one or more particular feature values,
      wherein the traversing the two or more trees yields two or more different classes comprising:
         a first class associated with a first tree of the two or more trees; and
         a second class associated with a second tree of the two or more trees; and
      determining a final class based upon at least one of a most frequent class or a more frequent class of the two or more different classes comprising the first class and the second class, wherein the ML classification is based upon the final class; and
   delivering digital content for display on a mobile communication device based upon the ML classification.

2. The method of claim 1, wherein the predicting the ML classification of the landing page comprising predicting an aesthetic appeal classification of the landing page.

3. The method of claim 1, wherein identifying the features comprises identifying visual features.

4. The method of claim 1, wherein the determining the combination of feature sets comprises determining that a combination of the color-type features and the markup language-related features are more discriminative at distinguishing between classes of mobile friendliness of the landing page than the one or more other feature sets.

5. The method of claim 1, wherein the determining the combination of feature sets comprises determining that a combination of the texture-type features and the markup language-related features are more discriminative at distinguishing between classes of mobile friendliness of the landing page than the one or more other feature sets.

6. The method of claim 1, wherein the determining the combination of feature sets comprises determining that a combination of the contrast-type features and the markup language-related features are more discriminative at distinguishing between classes of mobile friendliness of the landing page than the one or more other feature sets.

7. The method of claim 1, wherein identifying the features comprises identifying intrinsic features.

8. The method of claim 1, comprising determining that predictive performance of a combination of at least an image-related feature and an markup language-related feature is similar to predictive performance of an individual image-related feature.

9. The method of claim 1, wherein the combination of feature sets are determined to be more discriminative at distinguishing between the classes of mobile friendliness of the landing page than the one or more other feature sets using out-of-bag permutations.

10. A system comprising:
   at least one computing device, the at least one computing device to:
      identify features of a landing page;
      determine, based upon the features of the landing page, a combination of feature sets, comprising a combination of image-related features and markup language-related features, determined to be more discriminative at distinguishing between classes of mobile friendliness of the landing page than one or more other feature sets, wherein the image-related features comprise at least one of color-type features, texture- type features or contrast-type features;

selecting a machine learning (ML) classifier from among a plurality of ML classifiers based upon (i) testing a sample set of landing pages using the plurality of ML classifiers, (ii) determining that the ML classifier has a highest performance score amongst the plurality of ML classifiers, and (iii) comparing performance of the ML classifier with performance of a library tool configured with one or more defined library features;

predict, based upon a processing of the combination of feature sets and the features of the landing page using the ML classifier, an ML classification of the landing page as to post-click user experience of a mobile device user, wherein predicting the ML classification comprises:
traversing two or more trees associated with the landing page, from one or more root nodes to one or more leave nodes, based upon one or more rules specifying one or more ranges for one or more particular feature values,
wherein the traversing the two or more trees yields two or more different classes comprising:
a first class associated with a first tree of the two or more trees; and
a second class associated with a second tree of the two or more trees; and
determining a final class based upon at least one of a most frequent class or a more frequent class of the two or more different classes comprising the first class and the second class, wherein the ML classification is based upon the final class; and
deliver digital content for display on a mobile communication device based upon the ML classification.

11. The system of claim 10, wherein the at least one computing device is to predict an aesthetic appeal classification of the landing page.

12. The system of claim 11, wherein the features of the landing page comprise at least one of visual features or intrinsic features.

13. The system of claim 12, wherein the visual features comprise color- type features.

14. The system of claim 12, wherein the visual features comprise contrast- type features.

15. The system of claim 12, wherein the visual features comprise image quality-type features.

16. The system of claim 12, wherein the visual features comprise image layout-type features.

17. The system of claim 10, wherein a determination of whether to evaluate a left or right child of a node is based upon the one or more rules specifying the one or more ranges for the one or more particular feature values.

18. A non-transitory device readable medium comprising instructions that when executed by a processor perform operations comprising:

identifying features of a landing page;

determining, based upon the features of the landing page, a combination of feature sets, comprising a combination of image-related features and markup language-related features, determined to be more discriminative at distinguishing between classes of mobile friendliness of the landing page than one or more other feature sets, wherein the image-related features comprise at least one of color-type features, texture-type features or contrast-type features;

selecting a machine learning (ML) classifier from among a plurality of ML classifiers based upon (i) testing a sample set of landing pages using the plurality of ML classifiers, (ii) determining that the ML classifier has a highest performance score amongst the plurality of ML classifiers and (iii) comparing performance of the ML classifier with performance of a library tool configured with one or more defined library features;

predicting, based upon a processing of the combination of feature sets and the features of the landing page using the ML classifier, an ML classification of the landing page as to post-click user experience of a mobile device user, wherein predicting the ML classification comprises:
traversing two or more trees associated with the landing page, from one or more root nodes to one or more leave nodes, based upon one or more rules specifying one or more ranges for one or more particular feature values,
wherein the traversing the two or more trees yields two or more different classes comprising:
a first class associated with a first tree of the two or more trees; and
a second class associated with a second tree of the two or more trees; and
determining a final class based upon at least one of a most frequent class or a more frequent class of the two or more different classes comprising the first class and the second class, wherein the ML classification is based upon the final class; and
delivering digital content for display on a mobile communication device based upon the ML classification.

19. The non-transitory device readable medium of claim 18, the operations comprising:
predicting an aesthetic appeal classification of the landing page.

20. The non-transitory device readable medium of claim 18, the operations comprising:
predicting a mobile friendliness classification of the landing page based upon a number of links on the landing page.

* * * * *